Patented Jan. 19, 1932

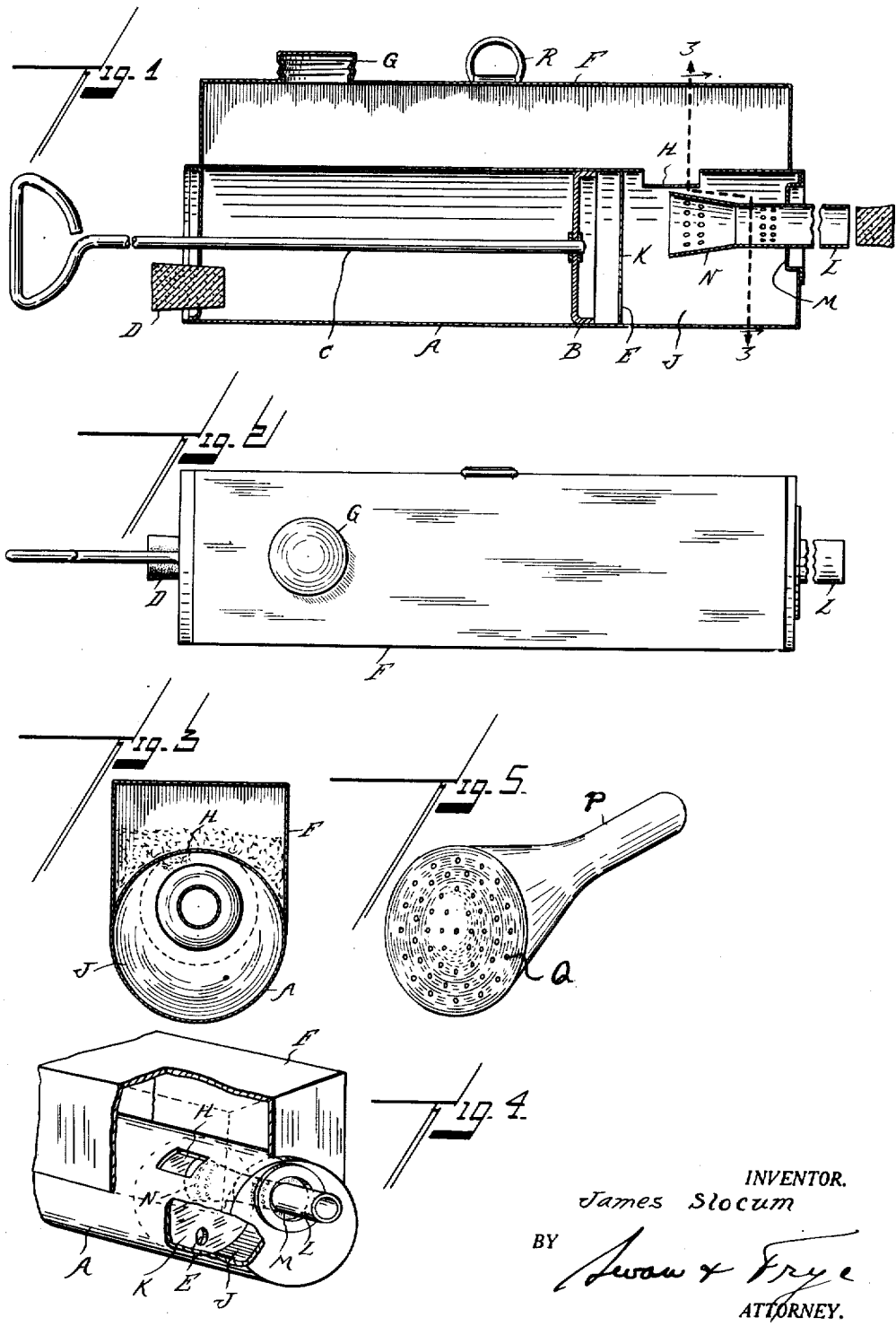

1,841,646

UNITED STATES PATENT OFFICE

JAMES SLOCUM, OF DETROIT, MICHIGAN

POWDER SPRAYER

Application filed August 28, 1929. Serial No. 388,899.

This invention relates to a powder sprayer, and has for its object an improved organization of parts adapted especially for use in directing a cloud or spurts of powder in a horizontal direction or one generally downward therefrom as compared with the level of the user's hand. While not restricted to such use, it is particularly adapted for the economical projection upon a fire of any one of the spraying powders now quite well known, but which are generally furnished for household or factory use in cylindrical containers, from which the tendency on the part of a user is to cause its ejection by more or less of a swinging or sweeping movement, which generally results in but a small fraction of the quantity ejected at any swing being thrown directly upon or adjacent the base of the flames which it is desired to quench, the rest being wastefully scattered around the floor at points too remote from the flames to be of any utility. Obviously as well, this device can also be used by fruit and vegetable growers who have occasion to use pulverized insect powder, or for spraying such powder into remote corners of a room.

In the drawings:—

Figure 1 is a side elevational view partly in section of my improved device.

Figure 2 is a plan view from above.

Figure 3 is a section taken along the line 3—3 of Figure 1, and looking in the direction of the arrows there shown.

Figure 4 is a perspective with parts of the wall broken away.

Figure 5 is a view of a modified form of nozzle.

A represents an ordinary pump cylinder provided with a piston B and with an actuating stem C, the handle portion whereof extends through an aperture in one end of the cylinder. The rear wall of the cylinder is also provided with an air inlet opening, which is closed when the device is not in use by the removable cork or plug D, and at the front end of the cylinder there is provided a discharge orifice E which is of appreciably smaller size than that of the air inlet opening in order to facilitate the creation of a pressure by the back and forth movement of the piston B.

Above substantially the entire length of the cylinder and indeed extending forwardly of the end thereof as thus far described, is the supply chamber F which is adapted to be filled through a suitable cap-closed opening G. The bottom wall of the supply chamber as it extends forwardly of the piston chamber, is provided with a gravity discharge aperture H, through which pulverized material stored in the chamber F may descend into the chamber J, which is in effect a continuation of the cylinder A, though spaced therefrom by the wall K in which the discharge aperture E is located.

In the forward wall of the chamber J is located an opening in which the outer discharge nozzle L is located. In the form illustrated in Figures 1, 4 and 6 this opening is preferably considerably larger in diameter than that of the discharge nozzle L, and is closed by a dished piece M through the center of which the discharge nozzle L extends. The inner end of this latter, that is to say, the portion normally positioned within the chamber J, has its walls perforated by a plurality of holes of suitable size as N, which, co-operatively with the outer tubular portion of the discharge nozzle constitute the only means of egress for the powder contained within the chamber J, which is therefore fed therethrough and through the tubular portion in relatively small quantities. Since, however, a relatively small quantity of the flame-quenching powder is all that is needed in most cases to quench an incipient fire, the repeated actuation of the pump is sufficient to accomplish this powder ejection in adequate quantities. For the sake of keeping the powder as free from caking as possible, it is preferable to keep both the inlet opening in the rear wall of the cylinder and the outlet end of the nozzle L closed, as by an easily removable cork, when not in use.

In the modified form illustrated in Figure 5 the constricted portion or tubular end P of the discharge nozzle is located within the chamber J, while the outer end is of truncated conical form like the spout terminal of a watering can, and is provided with terminal openings Q through which the pressure-ejected powder may escape under pressure of the manual actuation of the piston. Either of these described forms of nozzle makes the continued operation of the device possible, even though certain of the small perforation holes be temporarily clogged, as by a lump of the generally pulverized material. The device may be suspended from a conveniently located nail or cork when not in use, by means of the loop R.

What I claim is:

1. In a sprayer, in combination with a structurally integrated pump cylinder and supply container, the latter being of greater length than the cylinder, with its excess dimensional extent projecting beyond the discharge end thereof, and the bottom wall of such projecting forward portion being provided with a discharge aperture, a receiving and agitating chamber structurally integrated with such projecting end of the supply container and with the forward end of the cylinder, and into which granular material stored within the supply container is adapted to descend by gravity through the aperture in the bottom wall of the latter for pneumatic action by the discharge from said pump cylinder, and a discharge nozzle having its plurally apertured inner end located spacedly within said receiving and agitating chamber and generally above the level of the discharge orifice in the end of the cylinder and its discharge end projecting outwardly from the end wall thereof, whereby lumps of material in excess of a predetermined size are prevented from pneumatic ejection therethrough unless and until they have been diminished in size to the desired degree by repeated impact against the perforated inner end thereof.

2. A sprayer, having in combination with a cylinder and a manually operable piston contained therewithin, a superiorly positioned storage chamber for granular material, of greater length than said cylinder and extending forwardly therefrom accordingly, the bottom wall of such projecting forward portion being provided with a gravity discharge aperture, an agitating chamber positioned at the discharge end of said cylinder and beneath the forwardly projecting end of said storage chamber in position to receive the gravity-induced flow of granular material from the latter, and a discharge nozzle supported by the forward wall of said agitating chamber with its receiving inner end spaced generally centrally thereof, the inner end of said nozzle being plurally perforated to exclude from pneumatically induced ejection therethrough all granular masses in excess of a predetermined size.

3. In a powder sprayer, in combination with a pump, a receiving and agitating chamber structurally and communicably associated with the discharge end of said pump, a supply container, of a length substantially equal to that of the pump and the receiving and agitating chamber combined, positioned superiorly thereof and provided with a gravity discharge aperture in its lower wall for affording communication between its interior and that of said receiving and agitating chamber, and a nozzle supported by the forward wall of said receiving and agitating chamber and extending from a position generally central thereof with its discharge end passing through its said forward wall, the inner end of said nozzle being plurally perforated to permit the discharge through said nozzle of pulverized material in individual units only of a predetermined maximum size.

In testimony whereof I sign this specification.

JAMES SLOCUM.